United States Patent [19]

Yamaguchi

[11] 4,374,897

[45] Feb. 22, 1983

[54] CHROMIUM OXIDE-BASED SINTERED BODIES AND PROCESS FOR PRODUCTION THEREOF

[75] Inventor: Akira Yamaguchi, Kasugai, Japan

[73] Assignee: Nippon Chemical Industrial Co., Ltd., Tokyo, Japan

[21] Appl. No.: 240,436

[22] Filed: Mar. 4, 1981

[30] Foreign Application Priority Data

Mar. 4, 1980 [JP] Japan .................................. 55/26863
Apr. 12, 1980 [JP] Japan .................................. 55/28375
May 10, 1980 [JP] Japan .................................. 55/62090

[51] Int. Cl.$^3$ .................. B32B 9/04; C04B 35/56; C04B 35/48; C04B 35/12
[52] U.S. Cl. .................................... 428/446; 428/698; 428/699; 501/87; 501/103; 501/106; 501/132
[58] Field of Search .................. 501/103, 106, 132, 87; 428/446, 698, 699, 701

[56] References Cited

U.S. PATENT DOCUMENTS

| | | | |
|---|---|---|---|
| 1,362,317 | 12/1920 | Hutchins | 501/103 |
| 1,814,088 | 7/1931 | Housman | 501/132 |
| 2,271,368 | 1/1942 | Fulcher et al. | 501/132 |
| 2,694,646 | 11/1954 | Wagner et al. | 501/103 |
| 2,942,991 | 6/1960 | Smith | 501/132 |
| 3,181,958 | 5/1965 | Thomas | 501/103 |
| 3,192,058 | 6/1965 | Davies et al. | 501/103 |
| 3,773,531 | 11/1973 | Manigault | 501/103 |
| 3,971,665 | 7/1976 | Suzuki et al. | 501/132 |

*Primary Examiner*—Mark Bell
*Attorney, Agent, or Firm*—Sughrue, Mion, Zinn, Macpeak and Seas

[57] ABSTRACT

A highly densified chromium oxide-based sintered body is produced by heating a powder mixture of chromium sesquioxide and at least one substance selected from silica, zirconia and zircon in a carbon powder. The highly densified chromium oxide-based sintered body has excellent resistance to corrosion and excellent heat shock resistance, and thus is useful as a refractory material.

7 Claims, 13 Drawing Figures

CHROMIUM OXIDE-BASED SINTERED BODIES AND PROCESS FOR PRODUCTION THEREOF

FIELD OF THE INVENTION

This invention relates to sintered bodies of a mixture of chromium oxide and at least one substance selected from zirconia, zircon and silica, and a process for production thereof. More particularly, it relates to high density chromium oxide sintered bodies comprising $ZrO_2$-$Cr_2O_3$, $ZrSiO_4$-$Cr_2O_3$, $SiO_2$-$Cr_2O_3$, $ZrO_2$-$SiO_2$-$Cr_2O_3$ or $ZrO_2$-$ZrSiO_4$-$SiO_2$-$Cr_2O_3$, and to a process for the production thereof.

BACKGROUND OF THE INVENTION

Zirconia ($ZrO_2$), zircon ($ZrSiO_4$), silica ($SiO_2$) and chromium oxide ($Cr_2O_3$) are well known in the art as neutral or acid refractory materials, and are used alone or in combination with other refractory materials. For example, a zirconia sintered body is stabilized or partially stabilized and can be utilized as a refractory material, and a chromia (chromium oxide) sintered body has also been utilized, particularly as a refractory material for the production of long glass fibers.

A refractory sintered body comprising zirconia and chromium oxide has not yet been produced, however, because it is difficult to obtain a high density sintered body thereof. Similarly, a refractory material comprising zircon and chromium oxide has not yet been produced because of difficulty of densification to sinter such a composition, and only zircon-based refractory materials containing from about 1% to 5% by weight of $Cr_2O_3$ (which has been added to increase the corrosion resistance of the zircon-based refractory material) have been produced. In this case, however, since it is difficult to perform densification (that is, sintering to increase the density of the material), the performance cannot be improved to an extent that is sufficiently satisfactory.

Although a zircon refractory material has a small coefficient of thermal expansion, excellent heat impact resistance, and excellent abrasion resistance, it contains therein a number of pores, because it is difficult to perform densification of zircon alone (the densification cannot be achieved by high temperature heating because zircon is decomposed into zirconia and silica at about 1,500° C. or more). Therefore, when the zircon refractory material is used as a refractory material, easily reactable substances such as a slag liquid enter the pores and react with zircon to form zirconia and low melting point compounds. Such low melting point compounds then melt and flow from the refractory material. Thus the structure of the refractory material is made brittle and is subject to corrosion.

A chromia refractory material comprising mainly $Cr_2O_3$ has an excellent resistance to corrosion by liquid such a slag. However, it is inferior in heat stock resistance, because of its large coefficient of thermal expansion.

Although it would apparently be desirable to obtain $ZrO_2$-$Cr_2O_3$ or $ZrSiO_4$-$Cr_2O_3$ based refractory materials wherein the advantage of each component is exhibited compensating for the disadvantages of the other component, such refractory materials have not yet been produced in view of the foregoing difficulties.

A silica refractory material has a very small coefficients of thermal expansion at temperatures of about 600° C. or more, and has excellent heat shock resistance and furthermore great high temperature strength. However, its corrosion resistance to various slag liquids except for acid slags are relatively poor because it is an acid refractory material. Recent studies on phase equilibrium have revealed that the foregoing drawback of the silica refractory material might be overcome by adding thereto $Cr_2O_3$, and such addition of $Cr_2O_3$ is effective particularly for the improvement in resistance to attack of those slags comprising mainly iron oxide. It also appears that the inferior heat shock resistance of the chromia refractory material can be improved by adding thereto silica, whose thermal expansion properties at high temperatures are low. Thus, it may be expected that formation of a dense structure comprising these two components, i.e., silica and chromia, would lead to the production of an excellent refractory material.

However, $SiO_2$ and $Cr_2O_3$ do not produce any new compound, and the eutectic point of the mixture is 1,720° C., which is somewhat lower than the melting point of $SiO_2$ (1,723° C.), and sintering at high temperature causes evaporation of the $Cr_2O_3$. Thus it has heretofore been difficult to densely sinter a compact consisting of the two components of $SiO_2$ and $Cr_2O_3$ alone, and thus such refractory materials have not yet been produced.

It is also known, as described in Japanese patent application (OPI) No. 96508/1979, that a compact consisting of $Cr_2O_3$ alone can be densely sintered by heating it in carbon powder.

SUMMARY OF THE INVENTION

An object of this invention is to provide a high density chromium oxide-based sintered body comprising chromium oxide and at least one substance selected from silica ($SiO_2$), zirconia ($ZrO_2$) and zircon ($ZrSiO_4$).

Another object of this invention is to provide a process for production of the foregoing high density chromium oxide-based sintered body.

As a result of extensive studies, it has now been found that certain chromium-containing composite materials, such as $ZrO_2$-$Cr_2O_3$, $ZrSiO_4$-$Cr_2O_3$, and $SiO_2$-$Cr_2O_3$, can be densely sintered to conveniently obtain high density sintered bodies.

Such high density chromium oxide-based sintered bodies can be produced by heating a compact consisting essentially of a mixture of chromium oxide ($Cr_2O_3$) and at least one substance selected from silica, zirconia, and zircon, in a carbon reduction atmosphere.

DETAILED DESCRIPTION OF THE INVENTION

A major feature of chromium oxide-based sintered bodies according to this invention is that porosity is small, i.e., its density is high. The coefficient of linear thermal expansion (also referred to of the thermal expansion coefficient) of chromium oxide-based sintered bodies according to this invention is intermediate in value between the values of the components constituting such sintered bodies.

Hereinafter, this invention will first be explained in detail with reference to a zircon-chromium oxide sintered body.

Figure 1:
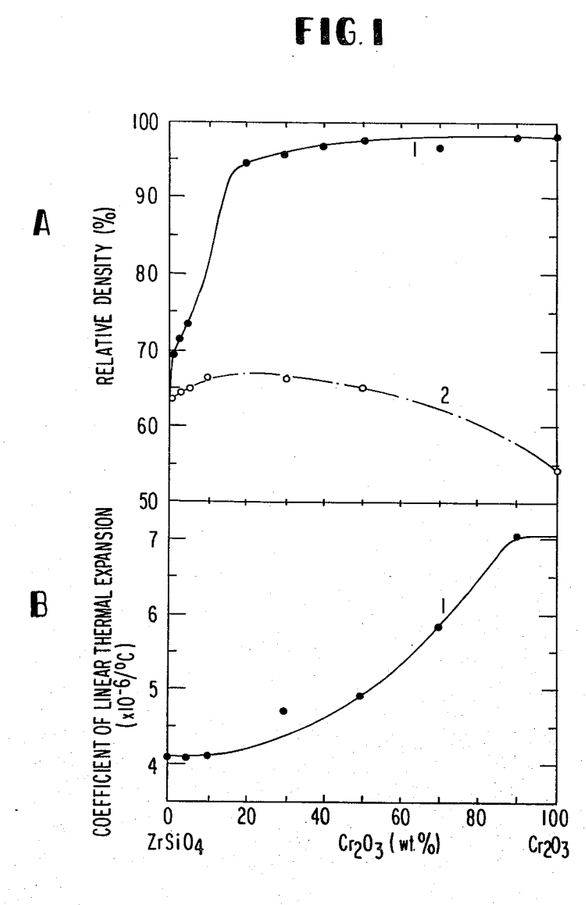
FIG. 1A shows the dependency of a relative density ((bulk density/true density)×100 (%)) of a sintered body comprising $ZrSiO_4$ and $Cr_2O_3$ on the ratio of $ZrSiO_4$ to $Cr_2O_3$, wherein Curve 1 indicates the relative density of the sintered body prepared by heating the $ZrSiO_4$-$Cr_2O_3$ mixture in carbon powder, and Curve 2 indicates the relative density of the sintered body prepared by heating in air.
FIG. 1B shows the dependency of the coefficient of linear thermal expansion of a sintered body comprising $ZrSiO_4$ and $Cr_2O_3$ on the ratio of $ZrSiO_4$ to $Cr_2O_3$, wherein Curve 1 indicates heating in carbon powder as in FIG. 1A.

FIG. 1 shows the dependency of the relative density (A) and the coefficient of linear thermal expansion (B) of a sintered body comprising zircon ($ZrSiO_4$) and chromium oxide ($Cr_2O_3$) on the ratio of zircon to chromium oxide, said sintered body being produced by heating a zircon-chromium oxide powder mixture at 1,500° C. for 2 hours in carbon powder (Curve 1) or in air (Curve 2). As can be seen from FIG. 1, the relative density of the sintered body is high when heated in carbon powder, and, more particularly, the porosity of the sintered body wherein the $Cr_2O_3$ content is 20% by weight or more is 5% or less.

Figure 2:
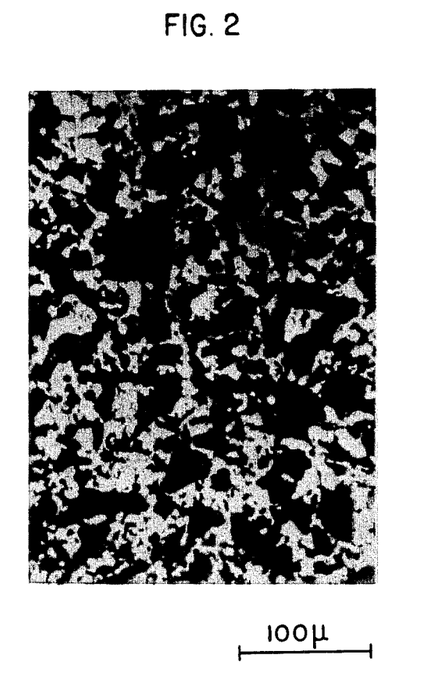
FIG. 2 is a reflection microscopic photograph of a polished surface of a sintered body comprising $ZrSiO_4$ and $Cr_2O_3$.

FIG. 2 is a reflection microscopic photograph of a polished surface of a $Cr_2O_3$-$ZrSiO_4$ (equivalent) body sintered in carbon powder at 1500° C. for 2 hours (Curve 1).

Figure 3:
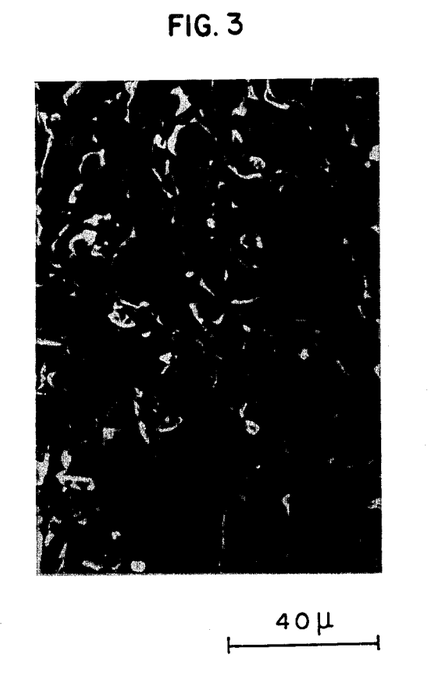
FIG. 3 is a scanning electromicrograph of a section of the sintered body of FIG. 2.

FIG. 3 is a scanning electromicrograph of a fractured surface of the same sintered body as in FIG. 2.

As can be seen from FIGS. 2 and 3, the sintered body has a uniform and dense structure. Such a dense structure almost completely prevents foreign substances from coming thereinto through pores, and furthermore the $Cr_2O_3$ component is non-wetting for and less soluble in liquids such as slag. Thus, the sintered body has an excellent resistance to corrosion as compared with a zircon refractory material.

Furthermore, as shown in FIG. 1, the coefficient of linear thermal expansion decrease with an increase in the ratio of zircon. At the same time, the heat shock resistance increases. Thus, the sintered body has a significantly improved coefficient of linear thermal expansion and heat shock resistance as compared with a chromia refractory material.

That is, as compared with the chromia refractory material, the sintered body of this invention is increased in heat shock resistance with almost no deterioration of the superior resistance to corrosion of the chromia refractory material, whereas as compared with the zircon refractory material, the sintered body of this invention is increased in resistance to corrosion without appreciably lowering the superior heat shock resistance of the zircon refractory material.

It is thus apparent that the sintered body of this invention is advantageous in resistance to corrosion over the zircon refractory material heretofore used as casting or continuous casting pit brick for use in production of iron.

Furthermore, since the zircon-chromium oxide based sintered body of this invention has a highly dense structure, and has high hardness and refractory properties, it can also be utilized as a special porcelain such as a crucible, a protective tube and a cutting tool.

Next, this invention will be explained with reference to a zirconia-chromium oxide based composite sintered body.

Figure 4:
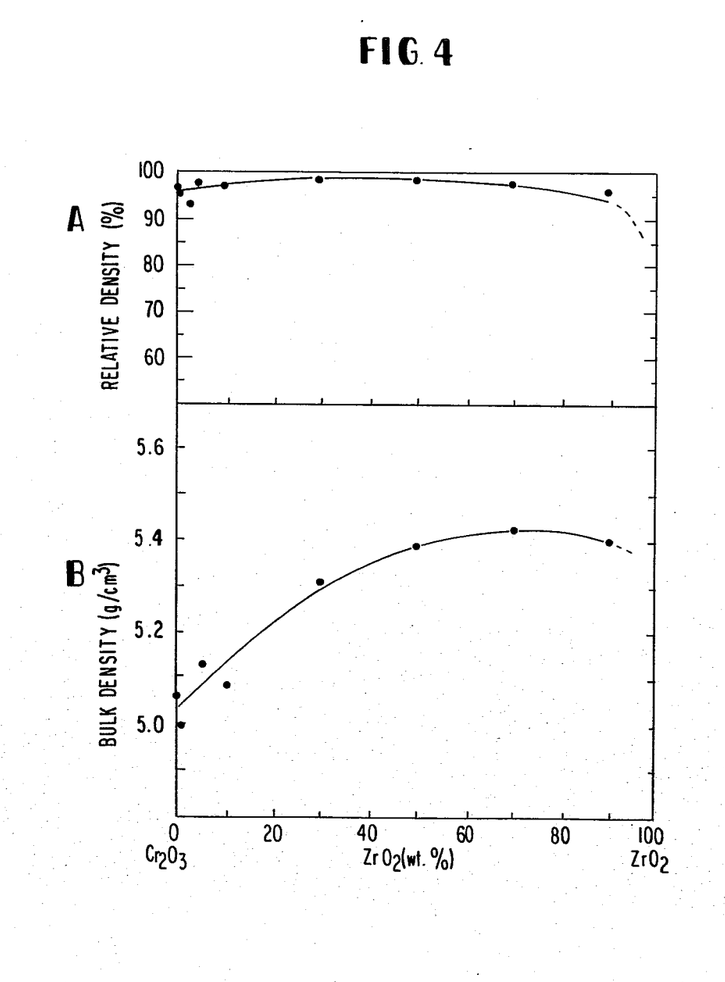
FIGS. 4A and 4B show the dependency of the relative density and bulk density, respectively, of a sintered body comprising $ZrO_2$ and $Cr_2O_3$ on the ratio of $ZrO_2$ to $Cr_2O_3$.

FIG. 4 shows the dependency of the bulk density and the relative density of a sintered body comprising zirconia ($ZrO_2$) and chromium oxide ($Cr_2O_3$) on the ratio of $ZrO_2$ to $Cr_2O_3$, said sintered body being prepared by heating a conpact at 1,500° C. for 3 hours in carbon powder as described in Example 2.

FIG. 4 indicates that the zirconia-chromium oxide sintered body of this invention has a high density structure.

Figure 5A:
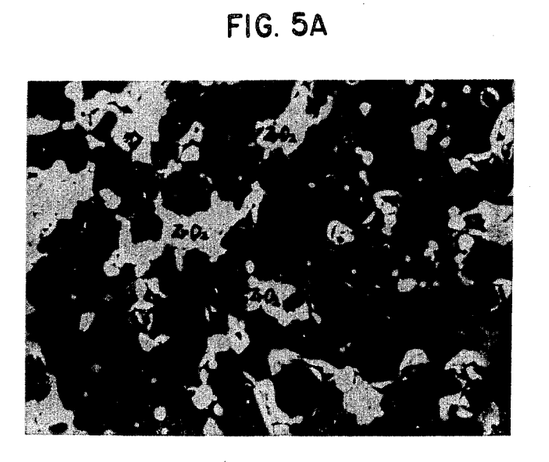
FIG. 5 shows scanning electromicrographs A, B and C of $ZrO_2$-$Cr_2O_3$ sintered bodies, wherein the $Cr_2O_3$ content is 70% by weight, 50% by weight and 30% by weight, respectively.
Figure 5B:
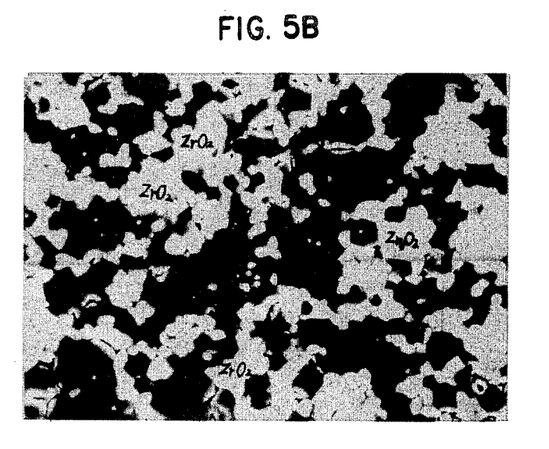
Figure 5C:
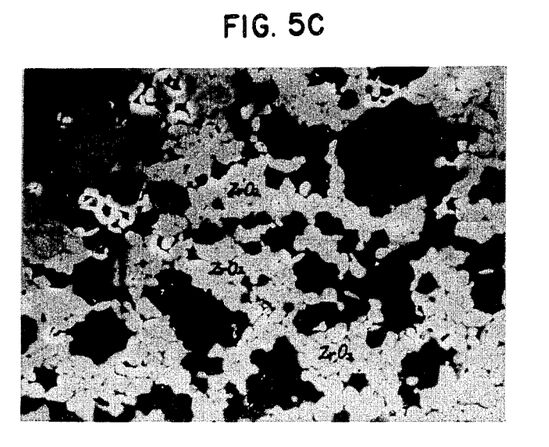
Figure 6D:
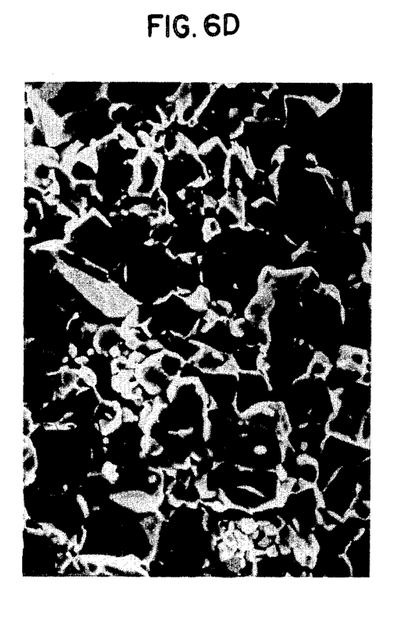
FIG. 6 shows scanning electromicrographs D, E, F and G of $ZrO_2$-$Cr_2O_3$ sintered bodies, wherein the $Cr_2O_3$ content is 90% by weight, 70% by weight, 50% by weight and 30% by weight, respectively.
Figure 6E:
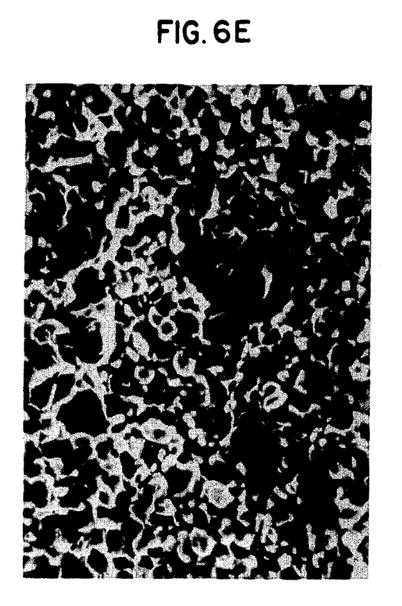
Figure 6F:
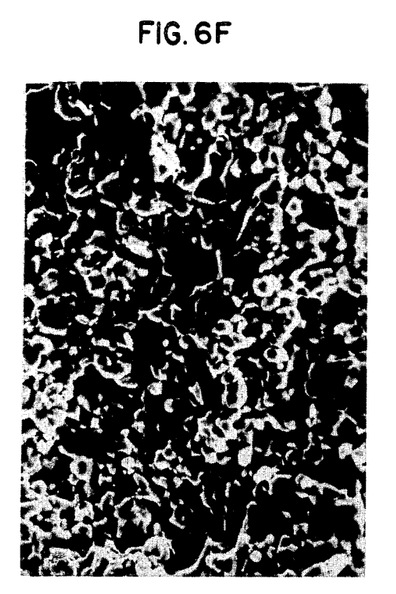
Figure 6G:
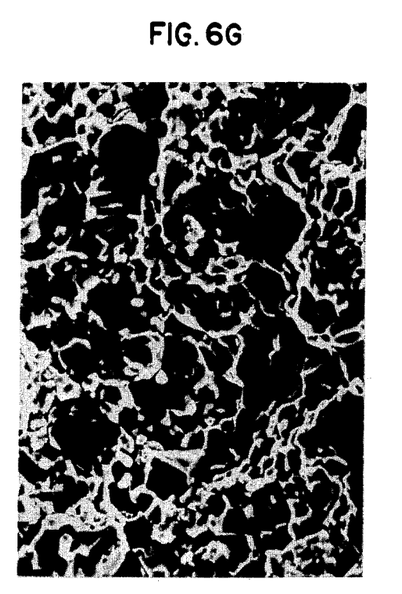

FIG. 5 shows scanning electromicrophotographs of polished surfaces of zirconia-chromium oxide sintered bodies A, B and C wherein the $Cr_2O_3$ content is 70% by weight, 50% by weight and 30% by weight, respectively. FIG. 6 shows scanning electromicrophotographs of fractured surfaces of the bodies D, E, F and G wherein the $Cr_2O_3$ content is 90% by weight, 70% by weight, 50% by weight and 30% by weight, respectively. From FIGS. 5 and 6, it can also be seen that the zirconia-chromium oxide sintered body of this invention has a high density microstructure.

One of the demerit of $Cr_2O_3$ is its tendency to evaporation at high temperatures, whereas $ZrO_2$ has the characteristics that its vapor pressure at high temperatures is small and its evaporation is very limited. In the $Cr_2O_3$-$ZrO_2$ sintered body of this invention, therefore, the evaporation is reduced with increasing ratio of $ZrO_2$ to $Cr_2O_3$, and thus the evaporation of the $Cr_2O_3$-$ZrO_2$ body of the present invention compared to refractory material consisting of $Cr_2O_3$ alone is greatly reduced. Furthermore, since $ZrO_2$ has an excellent resistance to corrosion like $Cr_2O_3$, and the eutectic point of $Cr_2O_3$ and $ZrO_2$ is 2,090° C. (reported in some papers to be 2,300° C.), the combination of $Cr_2O_3$ and $ZrO_2$ according to this invention provides improvements over a refractory material consisting of $Cr_2O_3$ alone without appreciable deterioration of its refractory properties.

$ZrO_2$ has a high melting point of about 2,700° C., and cannot be densely sintered at as low a temperature as within the range of the sintering temperature of this invention as hereinafter described. However, by heating a compact composed of $ZrO_2$ and $Cr_2O_3$ in carbon powder according to this invention, it is possible to obtain a very densely sintered body containing $ZrO_2$ at relatively low temperatures, e.g., from about 1,400° to 1,500° C. Furthermore, the thus obtained sintered body is increased in resistance to corrosion properties as compared with a sintered body consisting of $ZrO_2$ alone. Furthermore, since the sintered body consisting essentially of $ZrO_2$ and $Cr_2O_3$ has high chemical stability and high refractory properties, it can be used as a refractory material which is used under severe conditions at high temperatures.

In addition, since both $ZrO_2$ and $Cr_2O_3$ have high hardness, the sintered body wherein the two are very densely sintered can be expected to find many applications such as a crucible, a protective tube and a cutting tool.

This invention will be further described with reference to a silica ($SiO_2$)-chromium oxide ($Cr_2O_3$) composit sintered body.

Figure 7:
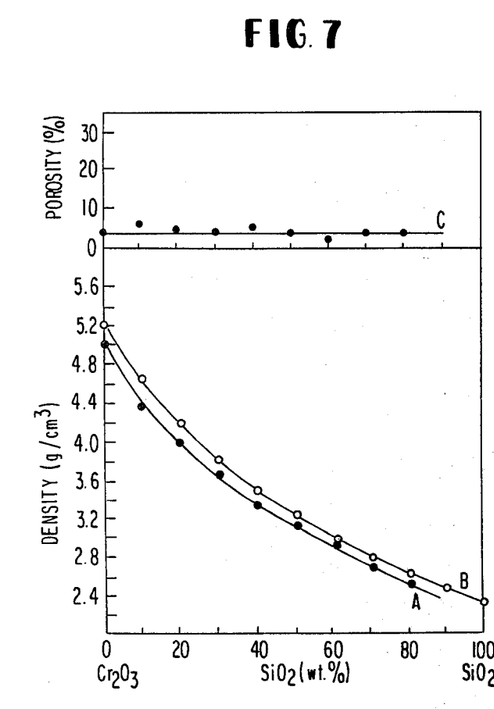
FIG. 7 shows the dependency of the bulk density (A), true density (B) and porosity (C) of a sintered body comprising $SiO_2$ and $Cr_2O_3$ on the ratio of $SiO_2$ to $Cr_2O_3$.

FIG. 7 shows the dependency of bulk density (A), true density (B) and porosity (C) of a sintered body comprising $SiO_2$ and $Cr_2O_3$ on the ratio of $SiO_2$ to $Cr_2O_3$, said sintered body being that produced in Example 3 described hereinafter.

Figure 8:
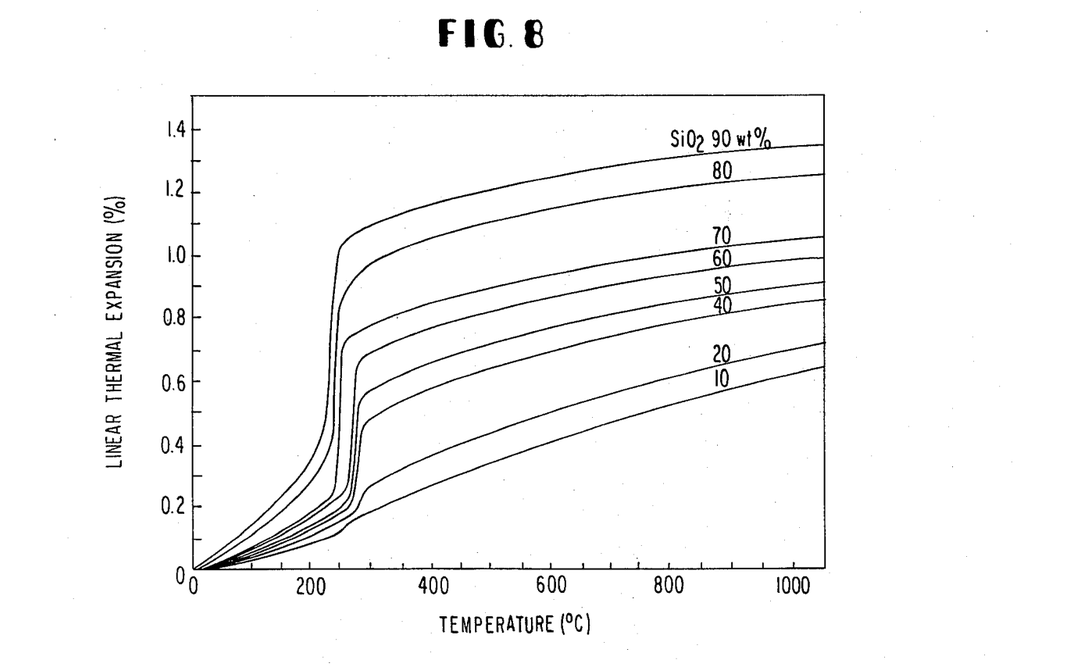
FIG. 8 shows linear thermal expansion curves for various sintered bodies.

FIG. 8 shows a linear thermal expansion curve of the $SiO_2$-$Cr_2O_3$ sintered body.

Figure 9:
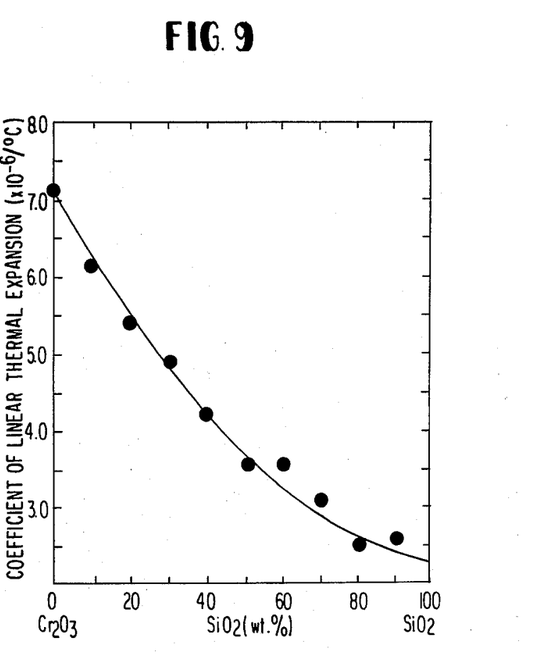
FIG. 9 shows the dependency of the average coefficient of linear thermal expansion between 500° and 1000° C. of a sintered body comprising $SiO_2$ and $Cr_2O_3$ on the ratio of $SiO_2$ to $Cr_2O_3$.

FIG. 9 shows the dependency of average coefficient of linear thermal expansion of a sintered body comprising $SiO_2$ and $Cr_2O_3$ on the ratio of $SiO_2$ to $Cr_2O_3$.

Figure 10:
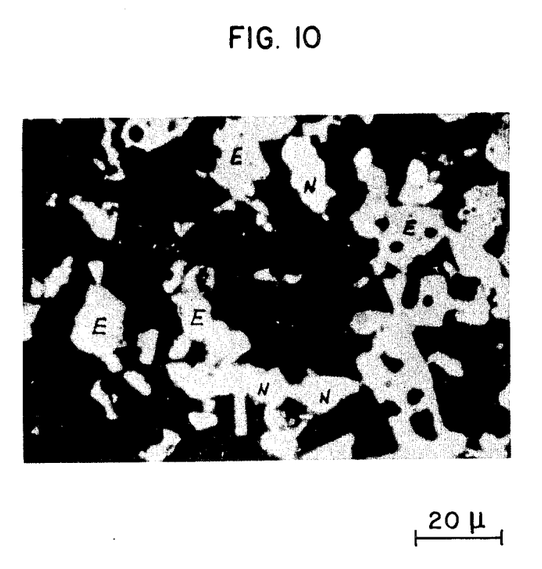
FIG. 10 is a reflection microscopic photograph of a section of a sintered body prepared from a $SiO_2$ (40% by weight)-$Cr_2O_3$ (60% by weight) mixture, wherein S, E. and N indicate cristobalite (a crystaline form of silica), $Cr_2O_3$, and $Cr_2(C,N)$, respectively.

As can be seen from FIG. 7, the chromium oxide-based composite sintered body prepared by mixing $SiO_2$ and $Cr_2O_3$ in any desired mixing ratio and sintering the resulting mixture has a porosity of 5% or less. Furthermore, $Cr_2O_3$ which has an excellent resistance to corrosion and is non-wetting by liquids such as slag, is present around $SiO_2$ particles, as shown in FIG. 10. Thus, the sintered body comprising $SiO_2$ and $Cr_2O_3$ has remarkably improved resistance to corrosion as compared with the conventional silica refractory material. Furthermore, the present sintered body contains no other components and is produced by densely sintering $SiO_2$ and $Cr_2O_3$ alone. Therefore, it does not produce a liquid phase until 1,720° C., and thus the sintered body has a high hot strength and can be stably used until that temperature.

As can be seen from FIGS. 8 and 9, the coefficient of linear thermal expansion of the sintered body comprising $SiO_2$ and $Cr_2O_3$, at temperatures of more than about 300° C., decreases with increasing ratio of $SiO_2$ to $Cr_2O_3$. Thus, with the present sintered body, the demerit of the chromia refractory material, i.e., poor heat shock resistance resulting from high expansion coefficients is greatly improved.

As described above, all the chromium oxide-based composite sintered body of this invention have a highly dense and very hard structure, and thus are excellent in their resistance to corrosion and heat shock resistance. For example, the relative density is typically about 90% or more, and the coefficient of linear thermal expansion is intermediate between those of the components constituting the sintered body and typically ranges between about $2.5 \times 10^{-6}$/°C. and $7.2 \times 10^{-6}$/°C.

Although the above explanation has been made with respect to the two component sintered bodies, it has been confirmed that sintered bodies of $ZrO_2$-$SiO_2$-$Cr_2O_3$ and $ZrO_2$-$ZrSiO_4$-$SiO_2$-$Cr_2O_3$ prepared by this invention have the same highly dense structure as the foregoing sintered bodies.

In producing such highly dense sintered bodies, chromium oxide plays the most significant role. That is, chromium oxide becomes easily sinterable by reduction heating in carbon powder, thereby providing a highly dense sintered body. Thus, the amount of the chromium oxide is significant and is sufficient to be at least 20% by weight, as $Cr_2O_3$, based on the total weight of the sintered body.

The chromium oxide-based composite sintered body of this invention can be produced as follows:

Firstly, the starting materials for production of the present sintered body will be explained. The chromium oxide which can be used is chromium sesquioxide ($Cr_2O_3$), zircon ($ZrSiO_4$), zirconia ($ZrO_2$) and silica ($SiO_2$) may be either crystalline or non-crystalline. In addition, precursors which are converted into zircon, zirconia and silica on heating can be used in this invention, if desired. Impurities, however, such as $Na_2O$, $K_2O$ and $CaO$, greatly inhibits the densification of $Cr_2O_3$ and it is therefore necessary to studiously avoid starting materials containing therein such impurities.

Since the grain size of the starting material influences the density of the resulting sintered body, it is desirable to adjust the grain size and in particular, the grain size of $Cr_2O_3$ exerts significant influences on the sintered body obtained. Thus, the average grain diameter of the chromium oxide starting material is about 4.5μ or less and preferably about 0.1 to 3.5 μm. On the other hand, the grain diameter of the other starting materials is sufficient to be in the range of from about 0.1 to 200 μm because their grain size exerts no significant influence on the densification.

Additionally, as a starting material, carbon powder is used. The carbon powder is used to control the oxygen partial pressure in or around a compact in heating the compact. Although the carbon does not become a major component of the sintered body, it is essential as an auxiliary starting material. Thus, the carbon powder as herein used is not so critical in grain size and type as in the foregoing starting materials. Carbon powders which can be used include coke powder and carbon black powder.

With regard to the proportion of the starting material mixture, the chromium oxide is preferably about 10% by weight or more, as $Cr_2O_3$, based on the total weight of the mixture, in order to provide a highly dense sintered body. In particular, the range of from about 20 to 99% by weight is preferred. Although the composition ratio should be determined by taking into consideration the application in which the resulting sintered body is to be used, this invention is characterized in that a sintered body having substantially stabilized physical properties can be obtained within the foregoing composition ratio.

The carbon powder is used in an amount required or sufficient for forming a reduction atmosphere in heating the starting materials and controlling the oxygen partial pressure, e.g., in an amount sufficient to cover a compact of the starting materials or in such an extent that at least a part of the carbon powder remains after heating of the compact. Addition of an excessive amount of carbon powder produces no particular problems except for economic and operational consideration.

In forming a compact of starting materials, it is necessary to mix them as uniformly as possible. The mixing can be performed by either a dry method or a wet method. In many cases, it is desirable to wet-mix by the use of water or a suitable organic solvent. Organic solvents which can be used include methanol, ethanol, acetone, methyl ethyl ketone, benzene and xylene, although this invention is not limited thereto.

The powder mixture is compression-molded by a known method. The molding method is not critical and various known methods, such as compression molding, cast molding, vibration molding and rubber press molding, can be used. The molding pressure varies depending on the form and size of the compact, and the use of the sintered body. Although the densification of the sintered body can be performed at 200 Kg/cm$^2$, the shrinkage is increased, resulting in easy cracking of the sintered body because the degree of packing is low. In many cases, therefore, the molding pressure is preferably at least about 300 Kg/cm$^2$, and more preferably from about 500 to 1,000 Kg/cm$^2$.

The thus-obtained compact is, if necessary after being dried, placed in a suitable heating furnace, such as an electric furnace, if desired, together with a refractory closed vessel in which the compact is accommodated. After charge-coating the compact with carbon powder, the compact is subjected to heating. The heating should be carried out at temperatures and for times required for the carbon-coated surface of the compact to form carbides, such as chromium carbide. Although the heating temperature and time vary depending on the type of the starting materials, the composition ratio, and the performance of the heating furnace used, it is suitable, in many cases, to perform the heating for at least about 0.5 hour, preferably from about 2 to 5 hours, in a heating atmosphere of from about 1,350° to 1,700° C., preferably from about 1,450° to 1,600° C. The reason for this is that evaporation of $Cr_2O_3$ undesirably occurs at higher temperatures.

This invention is characterized in that the heating of the compact is carried out in a carbon reduction atmosphere. As can be seen from FIG. 1A, the sintered body produced in air (Curve 2) is significantly inferior in relative density to the one produced in carbon powder (Curve 1). Thus, the high density sintered body of this invention cannot be obtained by heating in an ordinary atmospheres, even under otherwise the same conditions. Although the reason why such a difference results is not completely clear, it is believed that since the oxygen partial pressure in the carbon reduction atmosphere is nearly equal to the euilibrium oxygen partial pressure for the reaction, $2C+O_2 \rightarrow 2CO$, and is less than the equilibrium oxygen partial pressure for the reaction $4/3\ Cr+O_2 = \frac{2}{3}Cr_2O_3$ (at 1500° C.), a film of Cr, $Cr_3O_4$ or other reduced Cr compounds is formed on the surface of the $Cr_2O_3$ particles in an early stage of sintering and plays a role like a liquid phase during sintering to thereby enhance densification.

According to the method of this invention, a sintered body having high density, resistance to corrosion, and heat impact resistance can be obtained at relatively low temperatures ranging between about 1,450° C. and 1,600° C., and thus this invention is advantageous from an industrial standpoint. Furthermore, since the heating of this invention is carried out in carbon, the use of a suitable vessel having a heat resistance and being capable of retaining the carbon reduction atmosphere permits carrying out the heating by the use of a general use furnace, not a specific furnace, and thus leads to low production costs.

The sintered body of this invention has excellent physical properties, as described above, and thus can be used as a refractory material, such as a furnace material for production of long glass fiber and a furnace material for use in a steel furnace, or as a porcelain product, such as a crucible or a protective tube.

The following examples are given to illustrate this invention in greater detail, although this invention is not limited thereto.

EXAMPLE 1

A chromium sesquioxide powder (average grain size, 0.5 $\mu$m) and a zircon powder (average grain size, 20 $\mu$m) were mixed in various ratios in the presence of 70 ml, per 100 g of the mixture, of acetone. The resulting powder mixture was pressed into a 15 to 10 mm thick plate at a pressure of 800 Kg/cm$^2$ by the use of a 45×27 mm mold. The thus-obtained compact was placed in an alumina container. After packing a carbon powder around the compact, the alumina container was capped and placed in an electric furnace to effect heating at 1,500° C. for 2 hours. On the surface of the thus-heated sample, a 0.1 to 1 mm thick reaction layer comprising mainly chromium carbide was formed. Thereafter, the reaction layer was removed with hands to obtain a $ZrSiO_4$-$Cr_2O_3$ sintered body. The bulk density was measured, and on basis of the bulk density, the relative density ((bulk density/true density)×100) was calculated. For comparison, a comparative sample was produced by heating in an air atmosphere, and its relative density was measured.

The results are shown in FIGS. 1A and 1B. In the case of the heating in carbon powder (Curve 1), when the $Cr_2O_3$ content of the sintered body obtained was 20% or more, the relative density was 95% or more, and when the $Cr_2O_3$ content was 50% or more, the relative density was 98% or more. However, when the $Cr_2O_3$ content was less than 20%, the densification proceeded insufficiently, and when the $Cr_2O_3$ content was less than 10%, the relative density was less than 80%.

On the other hand, in the case of the heating in an air atmosphere (Curve 2), the heating at 1,500° C. caused almost no shrinkage at any $Cr_2O_3$ contents.

The coefficient of linear thermal expansion curve of the sintered body produced in the carbon powder was nearly straight. As shown in FIG. 1B, the coefficient of linear thermal expansion decreased with increasing ratio of zircon. The coefficient of linear thermal expansion of $Cr_2O_3$ itself is $7\times 10^{-6}$/°C., whereas when the zircon content was 50%, the coefficient of linear thermal expansion of the sintered body was $5\times 10^{-6}$/°C. and when the zircon content was 70%, it decreased to $4.7\times 10^{-6}$/°C.

EXAMPLE 2

A chromium sesquioxide powder (average grain size, 1 $\mu$m) and a zirconia powder (average grain size 10 $\mu$m) were mixed in various ratios in the presence of acetone in the same manner as in Example 1. The thus-obtained powder mixture was pressed into a 15 to 10 mm thick plate at a pressure of 800 Kg/cm$^2$ by the use of a 45×27 mm mold. The thus-obtained compact was placed in an alumina container. After packing a carbon powder around the compact, the alumina container was capped and placed in an electric furnace to perform heating at 1,500° C. for 3 hours. For the thus-obtained sintered body, the relative density and the bulk density were measured, and the results are shown in FIGS. 4A and 4B, respectively.

When the $Cr_2O_3$ content was more than 10% by weight, the relative density of the sintered body obtained was 95% or more. When the $Cr_2O_3$ content was from 30% to 70%, the compact was densely sintered to the extent that the relative density was 99% or more, and there were almost no pores.

As can be seen from the scanning electromicrographs of polished surface of the bodies shown in FIG. 5, $Cr_2O_3$ and $ZrO_2$ particles were uniformly distributed in the sintered body. Furthermore, the scanning electromicrographs of FIG. 6 indicate that there were almost no pores and the sintered body was a dense aggregation of 5 to 20$\mu$ $Cr_2O_3$ and $ZrO_2$ particles. When the heating was carried out at 1,400° C. for 3 hours, substantially the same results as in the case of heating at 1,500° C. were obtained.

EXAMPLE 3

Silicic acid anhydride (average grain size, 12 $\mu m$) obtained by a wet method and the same chromium sesquioxide as used in Example 1 were uniformly mixed in various ratios, and the resulting mixture was pressed into a 15 to 10 mm thick plate at a pressure of 800 Kg/cm$^2$ by the use of a 45×27 mm mold. The thus-obtained compact was placed in an alumina container. After packing a carbon powder around the compact under the same conditions as in Example 1, the alumina container was capped. The thus-capped alumina container was placed in an electric furnace to effect heating at 1,500° C. for 2 hours.

On the surface of the thus-heated compact, a 0.1 to 1.5 mm thick reaction layer was formed, and the reaction layer was porous and was rich in cristobalite. After removal of the reaction layer, the bulk density and the porosity were measured. As shown in FIG. 7, the porosity was 5% or less all over the composition range.

Figure 11:
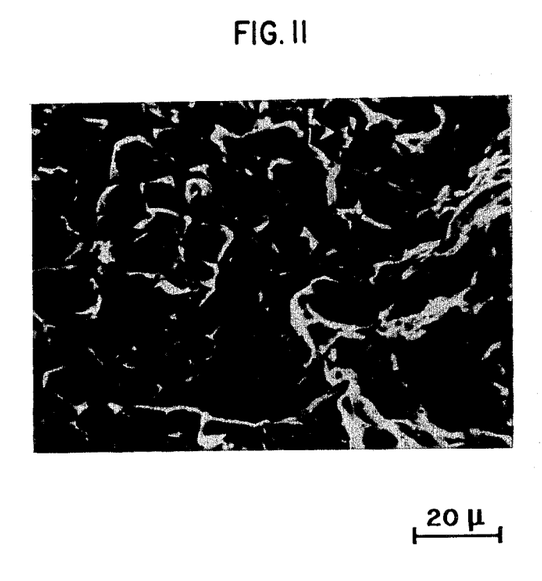
FIG. 11 is a scanning electromicrograph of a fractured surface of the same sintered body as in FIG. 10.

X-ray analysis of the sintered body showed that the sintered body comprised cristobalite, $Cr_2O_3$ and a small amount of $Cr_2(C,N)$. In the sintered body comprising 40% by weight of $SiO_2$ and 60% by weight of $Cr_2O_3$, cristobalite particles and $Cr_2O_3$ particles were uniformly distributed as shown in the reflection microscopic photograph of FIG. 10, and they were densely sintered as shown in the scanning electromicrograph in section of FIG. 11. With regard to the linear thermal expansion of the sintered body, as shown in FIG. 8, abnormal expansion resulting from the transition from $\alpha$-cristobalite to $\beta$-cristobalite was observed at 220°-280° C., but at temperatures higher than the 220°-280° C. range, the linear thermal expansion increased at a substantially constant rate. The coefficient of linear thermal expansion decreased as the ratio of $SiO_2$ increased, as shown in FIG. 9.

While the invention has been described in detail and with reference to specific embodiments thereof, it will be apparent to one skilled in the art that various changes and modifications can be made therein without departing from the spirit and scope thereof.

What is claimed is:

1. A highly densified chromium oxide-based sintered body having a relative density of at least 90% and a linear thermal expansion coefficient of from $2.5\times10^{-6}/°C$. to $7.2\times10^{-6}/°C$. produced by heating a compact consisting of chromium oxide and at least one substance selected from silica ($SiO_2$), zirconia ($ZrO_2$), and zircon ($ZrSiO_4$) in a carbon reduction atmosphere wherein the surface of the compact is converted to a carbide during the heating period.

2. A highly densified chromium oxide-based sintered body as in claim 1 wherein the chromium sesquioxide content is at least 20% by weight.

3. A highly densified chromium oxide-based sintered body as in claim 1, wherein the chromium oxide content is from 20 to 99% by weight of the sintered body, as $Cr_2O_3$.

4. A highly densified chromium oxide-based sintered body as in claim 1, wherein the carbide is chromium carbide.

5. A highly densified chromium oxide-based sintered body as in claim 4, wherein the at least one substance is silica ($SiO_2$).

6. A highly densified chromium oxide-based sintered body as in claim 4, wherein the at least one substance is zirconia ($ZrO_2$).

7. A highly densified chromium oxide-based sintered body as in claim 4, wherein the at least one substance is zircon ($ZrSiO_4$).

* * * * *